(12) United States Patent
Soloff et al.

(10) Patent No.: US 8,666,941 B2
(45) Date of Patent: **\*Mar. 4, 2014**

(54) SYSTEM AND METHOD FOR PERSISTENT STORAGE OF COMMON USER INFORMATION FOR INTERACTIVE TELEVISION USING A CENTRALLY LOCATED REPOSITORY

(75) Inventors: Steven M. Soloff, Tamarac, FL (US); Carlos Gonzalez, Coral Springs, FL (US); Edward P. Jurado, Wellington, FL (US)

(73) Assignee: The DIRECTV Group, Inc., El Segundo, CA (US)

( \* ) Notice: Subject to any disclaimer, the term of this patent is extended or adjusted under 35 U.S.C. 154(b) by 8 days.

This patent is subject to a terminal disclaimer.

(21) Appl. No.: 12/939,510

(22) Filed: Nov. 4, 2010

(65) Prior Publication Data

US 2011/0055159 A1 Mar. 3, 2011

Related U.S. Application Data

(63) Continuation of application No. 10/313,780, filed on Dec. 5, 2002, now Pat. No. 7,844,994.

(60) Provisional application No. 60/366,770, filed on Mar. 22, 2002.

(51) Int. Cl.
*G06F 17/30* (2006.01)
*H04N 7/16* (2011.01)

(52) U.S. Cl.
USPC .......... 707/634; 725/131; 725/145; 715/224; 715/225

(58) Field of Classification Search
USPC ......................................... 707/634
See application file for complete search history.

(56) References Cited

U.S. PATENT DOCUMENTS

| | | | |
|---|---|---|---|
| 5,563,648 | A | 10/1996 | Menand et al. |
| 5,819,034 | A | 10/1998 | Joseph |
| 6,016,158 | A | 1/2000 | Mackinnon |
| 6,326,982 | B1 | 12/2001 | Wu et al. |
| 6,618,858 | B1 | 9/2003 | Gautier |
| 7,752,214 | B2 \* | 7/2010 | Pizzorni et al. ............... 707/756 |
| 2002/0010679 | A1 \* | 1/2002 | Felsher .......................... 705/51 |
| 2002/0013827 | A1 | 1/2002 | Edstrom et al. |
| 2002/0069076 | A1 \* | 6/2002 | Faris et al. ....................... 705/1 |
| 2002/0075844 | A1 \* | 6/2002 | Hagen .......................... 370/351 |
| 2002/0078453 | A1 | 6/2002 | Kuo |
| 2002/0112237 | A1 | 8/2002 | Kelts |
| 2002/0124253 | A1 | 9/2002 | Eyer et al. |
| 2002/0162118 | A1 | 10/2002 | Levy et al. |
| 2002/0174433 | A1 \* | 11/2002 | Baumgartner et al. ......... 725/58 |
| 2003/0037335 | A1 \* | 2/2003 | Gatto et al. |
| 2003/0105679 | A1 | 6/2003 | Krishnan et al. |
| 2003/0126607 | A1 | 7/2003 | Phillips et al. |
| 2003/0217369 | A1 | 11/2003 | Heredia |
| 2005/0283800 | A1 | 12/2005 | Ellis et al. |

\* cited by examiner

*Primary Examiner* — Shyue Jiunn Hwa

(57) ABSTRACT

For interactive television subscribers, a system (10) and method for persistent storage of common information relating to a user (25) required by multiple disparate iTV applications to be shared among said applications to ease the burden of data entry off the user. Subscribers do not have to repeatedly enter the same common user information required by multiple applications. The registration information inputted by a user (25) is logged, temporarily stored in the STB (35), and its contents transmitted to a remote central repository (100) at predetermined intervals.

27 Claims, 7 Drawing Sheets

FIG. 3                                   ─ 200

MAIN MENU
Use the arrow keys to navigate to your choice.
Press OK

- ▷ Create administrator
- ☐ Phone Number Setup
- ☐ Download Registry
- ☐ Disconnect
- ☐ Exit

☐ GO BACK    ☐ INFO    ☐ MENU

FIG. 4                                   ─ 210

PHONE NUMBER SETUP
Use the arrow keys to navigate to a local
phone number. Press OK.

| CITY | PHONE NUMBER |
|------|--------------|
| NOC  | 92293758     |
| NOC  | 92293758     |
| NOC  | 92293758     |
| NOC  | 92293758     |
| NOC  | 92293758     |
| NOC  | 92293758     |
| NOC  | 92293758     |
| NOC  | 92293758     |

☐ GO BACK    ☐ INFO    ☐ MENU

FIG. 5

CREATE ADMINISTRATOR
Use the arrow keys to navigate to your choice.
Press OK

PERSONAL IDENTIFCATION NUMBER

NUMERIC PASSWORD

CONFIRM PASSWORD

CREATE

☐ GO BACK   ☐ INFO   ☐ MENU

FIG. 6

ACCOUNT MANAGEMENT
Use the arrow keys to navigate to your choice.
Press OK

Administrator

ADD USER

EDIT USER

REMOVE USER

☐ GO BACK   ☐ INFO   ☐ MENU

SYSTEM AND METHOD FOR PERSISTENT STORAGE OF COMMON USER INFORMATION FOR INTERACTIVE TELEVISION USING A CENTRALLY LOCATED REPOSITORY

CROSS-REFERENCE TO RELATED APPLICATIONS

The present application is a continuation of U.S. patent application Ser. No. 10/313,780, filed on Dec. 5, 2002, which claims priority to U.S. Provisional Patent Application No. 60/366,770, filed on Mar. 22, 2002, both of which are incorporated by reference herein.

BACKGROUND OF THE INVENTION

1. Field of the Invention

This invention relates generally to an interactive television platform that includes several disparate user applications such as games, weather, banking and e-mail, and specifically to an apparatus and method for persistently storing subscriber information related to the interactive television applications remotely in a set-top box and in a single centrally located repository. This allows common user information used by multiple disparate applications to be shared among said applications to ease the burden of data entry of the user.

2. Description of the Prior Art

Satellite and cable television provide an interactive television platform which may consist of a plethora of disparate user applications, such as games, shopping, weather, banking, and e-mail. Although these applications do not necessarily work together, they often require the same information to be inputted by a user in order to operate. For example, any application that uses a backchannel, such as a two-way dial-up to the satellite television interactive platform, requires a phone number to access the local point-of-presence (PoP). Conceivably, each application could provide a user interface (UI) that would allow the user to choose a PoP. However, as the number of user applications using the same backchannel increases, this not only becomes inefficient for a satellite television service provider (since multiple PoP lists would have to be maintained), but also aggravating for the user who must repeatedly enter the same information.

Additionally, a solution to this problem opens a gateway to future technologies for interactive television such as one-click shopping (in which previously entered credit card debit information and mailing addresses are used to order items for the subscriber with a single keypress, rather than requiring the user to repeatedly enter constant information).

U.S. Pat. No. 5,819,034 issued to Joseph, et al. describes an apparatus for transmitting and receiving executable applications for a multi-media system. The patent discloses a distributed computer system for interactive TV applications that allows a viewer to turn on an interactive TV channel at any time and allows all viewers to proceed at different paces.

U.S. Pat. No. 5,563,648 issued to Menand, et al. shows a method for controlling execution of an audio/video interactive program that can be used with interactive television systems. The method employs receiving a packet stream that includes a directory and AVI program including an associate identifier in the directory.

Neither of these patents disclose a system that provides for user friendly information storage that allows a user with an interactive television to not have to enter the same common information over and over again when each different application program is accessed by the interactive television user.

It is, therefore, to the effective resolution of the aforementioned problems and shortcomings of the prior art that the present invention is directed.

SUMMARY OF THE INVENTION

An interactive television system having disparate user applications that includes apparatus and method for persistent storage of common user information that employs a single application, referred to as the registration application, which collects all such common information from a user and stores it in a centrally located repository owned by the satellite television service provider. With such a system in place, the disparate applications such as games, e-mail, and banking on the network must now only provide a UI that directs the user to the registration application anytime some piece of common information is required. The next time the user uses an application that requires the same information, that data will already be available. In addition, the user may create a number of separate accounts. An overview of the proposed solution is presented below.

An interactive satellite television system is selected as a preferred embodiment for the invention. A conventional satellite television broadcast system includes a satellite service provider that has a broadcast station that transmits a variety of television channels along with interactive application services by uplink to satellite transponders from which are broadcast back to the user through a user satellite dish to the user television set and to a set top box (STB) at the user's locations. The satellite television service provider's system includes multiple disparate server applications in addition to the television services to provide interactively through the user's set top box, games, e-mail and banking services. A phone line is used for callback. The present invention, both apparatus and method, is then implemented into the television service provider's overall system that is described below.

The invention includes providing a central repository coupled to an LDAP server and ISA connected to the point of presence (Pop). The user requires a phone line to the Pop through the STB. Each user can represent up to five separate household accounts.

In general terms, the central repository is simply some sort of database that maps interactive television-related information to a subscriber. Preferably, the basic set of commands from the user that the repository must support are adding an account, adding an account or user attribute (a piece of information), querying the value of an account or user attribute, and modifying the value of an account or user attribute. Additional commands, such as deleting an account, may be added as necessary but are not required.

If it were necessary to connect to the central repository every time a piece of common information was required by an application running on the remote client, the latency, or delay, introduced would likely be as frustrating to the user as entering the information multiple times. In order to facilitate easy access to this information, the appropriate portion of the user record from the central repository is replicated remotely, preferably at the remote client's set-top box. This data store is technically known as the remote repository, but it will be addressed as the "registry."

Preferably, the entire user record is not replicated; rather, only the information that a remote application may require is stored. Attributes pertaining to a user's profile but which are either imposed by administrative requirements or are not needed until the application is connected need only be stored in the central repository. An example might be a quota for an e-mail system: such a value is not useful to the user and the e-mail account holder, but would be needed by the e-mail server.

The registry is an important part of the system architecture. It stores attributes of a single subscriber on the remote client. Because the equipment of the interactive television users (i.e. set-top boxes, or STBs) tend to have very limited resources such as RAM, persistent storage and/or Flash memory, the registry preferably uses a very efficient storage format in order to be as small as possible. Additionally, applications must be able to perform fast index-based searches on the registry, so the registry's format should be amenable to this requirement. It is important that any applicable relevant changes made to the central repository are replicated in the registry and vice versa. As will be discussed below, a procedure has been devised to automatically update either data store whenever the client is connected to the backchannel.

The registry simply provides the user with a convenient place to store frequently accessed data. It is necessary to provide two other components to the user: 1) an application programming interface (API) that more than one interactive television application can use to access the registry, and 2) a registration application that the subscriber can use to access and edit the registry. The API component will be examined first.

The API component must provide the ability for other applications to search the registry and retrieve specific attributes. It is not necessary for the API to provide a method to modify the registry because in the preferred embodiment, only the registration application should be allowed to modify the registry. However, based upon the needs of the service provider, the API may alternatively provide a method to modify the registry.

The registration application is the primary point of interaction for the subscriber, or user. Within this application, the user can modify some or all of the interactive television attributes related to one or more accounts in the user's household. For example, the ability to purchase movies or the right to view events, or to order products, may be restricted or granted by the user to a particular account via the API. The registration application is preferably also responsible for synchronization issues between the registry and the central repository. When using the application, it is preferred that a connection is established between the client and the central repository. Thus, changes made by the user are immediately reflected in the central repository. For changes made at the central repository, a time stamp-based scheme is used to inform the client that it must refresh the information in the remote registry via a download. The time stamp also has the beneficial side effect of ensuring multiple clients in a single household, through their STBs, are also kept synchronized when a change is made on only one account; the remaining accounts will have their registry updated automatically the next time they connect to the interactive television service network.

The central repository is preferably implemented using a directory service. The lightweight directory access protocol (LDAP) is preferably used to issue commands to the service, because it is a standard, easy-to operate protocol. However, other protocols may be used. Because the remote client is not capable of implementing the requirements of the LDAP protocol, a proxy server is necessary to translate requests from the client, which preferably uses a proprietary protocol, such as ISA, to LDAP and vice versa.

The registry on the client is preferred to be a flat file consisting of name/value pairs in the format "<name>=Kvalue>\n", where "\n" is a new line character. This format is preferable because it takes fewer resources to index within the set-top box; however, other equivalent formats may be used. The registry API provides all the capabilities required above, in addition to implementing some performance enhancing features such as caching (due to extreme performance degradation involved in repeatedly accessing the flash file system). It is preferred that only the registration application is given write access to the registry in order to prevent other applications from modifying it outside of the context of the registration application. Presently in the art, entries in the file are not encrypted. Thus a rogue application may potentially steal sensitive user information. In an alternative embodiment, an encryption may be added.

The registration application is preferably implemented using the OpenTV API, because in addition to the basic requirements outlined in the previous section, it allows a single household to have an administrative user plus five household users. Thus, a single user record in the central repository/local registry may actually describe the attributes of up to five individual accounts. The purpose of the administrative user is to manage the household accounts, thus allowing a single point of access for creating, deleting and/or editing user accounts and/or restricting access to certain interactive television content.

It is an object of this invention to provide persistent storage for user information in an interactive television system that provides multiple, disparate applications, including games, e-mail and banking to alleviate the necessity of the user having to enter common information over and over again each time a different application is used.

It is yet another object to the invention to provide an improved interactive television system, method and architecture that reduces the repetitive and time consuming entry of common user information for disparate multiple applications to save user time.

BRIEF DESCRIPTION OF THE DRAWINGS

FIG. 3 is a screen shot of the main menu of the preferred embodiment of the invention.

FIG. 4 is a screen shot of a list of telephone numbers in the preferred embodiment of the invention.

FIG. 5 is a screen shot of an administrator creation screen in the preferred embodiment of the invention.

FIG. 6 is a screen shot of an account set-up screen in the preferred embodiment of the invention.

DESCRIPTION OF THE PREFERRED EMBODIMENT

Figure 1:
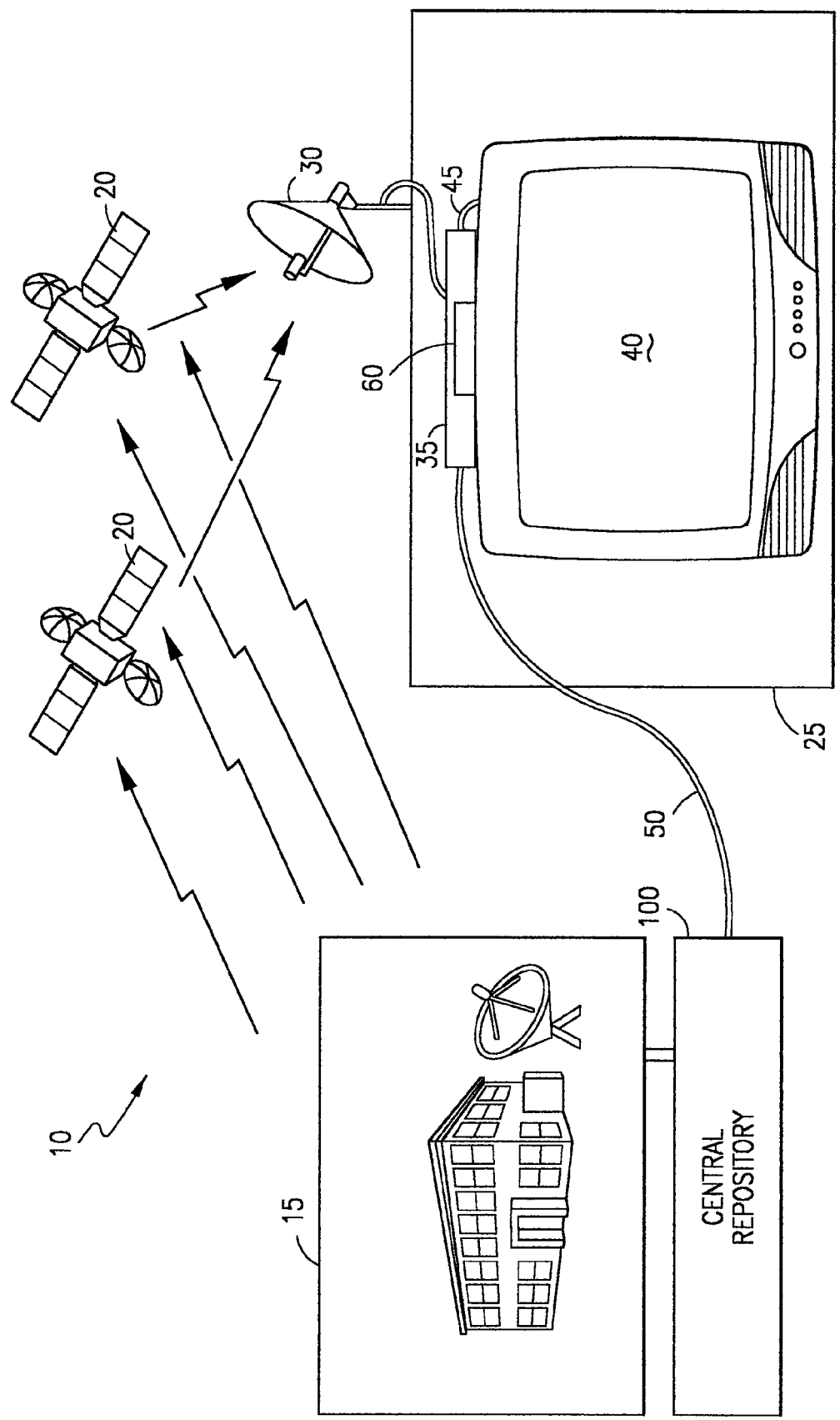
FIG. 1 is a schematic diagram illustrating the basic satellite television components incorporating the present invention.

Referring to FIG. 1, the basic system architecture for the provision of an interactive satellite television service is shown at 10. In the diagram, interactive television service provider utilizes satellites; however, the television service may be provided by cable broadcast or equivalent system. In a conventional interactive television service, content is broadcast from a broadcast center 15 at a remote location. The content is uplinked to one or more communication satellites 20. Also uplinked are ancillary data and computer programs for interactive television applications as well as a registration application. A subscriber or user 25, at a location within the satellite's footprint, receives the broadcast via a satellite dish antenna 30. The signal is then passed on to the user's set-top box (STB) 35, or Integrated Receiver/Decoder (IRD). The STB 35 is connected to a graphical user interface (GUI), such as the user's television set 40 or other data viewing device via a standard connection such as a serial data cable 45. Interacting with the downloaded programs, the user then inputs pertinent data for the registration application into data storage within the STB 35 by a keyboard, remote or equivalent device. The data is collected, and initially stored in a local memory storage device 60 within the STB 35, such as RAM or FLASH memory, as a local registry. It can then be transmitted, via traditional data communication device, preferably via a phone line and modem 50, to a central repository 100, which is preferably in electronic communication with the original broadcast center 15. In the preferred embodiment, the transmission of the data is performed in a call-back to a predetermined telephone number, giving the user a unique point of presence (PoP) to the system 10.

In an alternate embodiment of the present invention, the registration information can be transmitted either to the broadcast center 15 or the central repository 100 via traditional, wireless communication device.

This invention provides a method for persistently storing user information related to registration for interactive television applications in a single centrally located repository. A computer program comprising a series of computer instructions that facilitates registration for applications is transmitted to and stored in a registry in a digital storage medium, located in the STB 35 itself.

Figure 2:
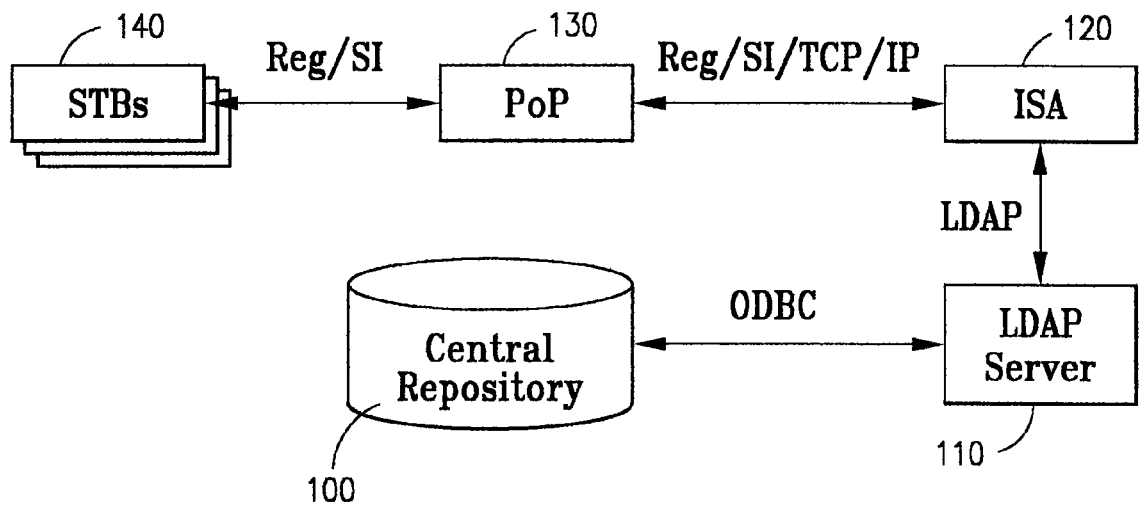
FIG. 2 is a schematic diagram illustrating the architecture for the transmission of data in the preferred embodiment of the invention.

As shown in FIG. 2, the central repository 100 of user information is a database which may be resident in its own computer or be a database located within a server with multiple functions. Preferably, the central repository 100 is in its own separate location. The central repository 100 is accessed and manipulated by a directory server 110 through a separate directory service. Alternatively, a database and database manager or equivalent may be used. In the preferred embodiment, Lightweight Directory Access Protocol (LDAP) is the service used. LDAP is both an information model and a protocol for querying and manipulating it. The LDAP protocol is especially preferred because it is a standard protocol and it has the ability to run directly over a TCP/IP stack. As shown in FIG. 2, it is preferred that there is communication between the central repository 100 and the directory server 110, such as that provided in Microsoft's Open DataBase Connectivity (ODBC) protocol. However, use of this protocol will require that the central repository and the registration application are both ODBC-compliant.

In the preferred embodiment, the STB 140 of the user utilizes a proprietary protocol to transmit inputs into the registration application such as Reg or SI. In FIG. 2, the PoP 130 is for a single STB with several accounts in the household. A proxy server 120 is used to handle registration information from the PoP user. As shown, the proxy server 120 preferably uses a protocol such as ISA protocol for the distribution of the registration information obtained from the users. However, other equivalent protocols may be used.

In the preferred embodiment, registration information is obtained for each point-of-presence (PoP) 130. A PoP 130 is a unique location for a user, preferably a telephone number. The phone number is the number used by the STB to establish electronic communication with the central repository. As shown, in the situations where a particular user of the service has several accounts in STB 140 at his location, it is preferred to have a single PoP 130. User ad account registration data flows to a PoP under a transmission protocol such as Reg or SI. Furthermore, data flows from the PoP to the proxy server under a protocol stack that may include protocols such as Reg, SI, TCP or IP.

The central data repository 100 is a database that maps interactive television-related information to a particular user or PoP in a record. In the preferred embodiment, the repository 100 must support commands including: adding a user, adding an attribute to a particular user or set of users, querying the value or status of a particular attribute, and modifying the value of an attribute. Part or all of the information found on the record is replicated within the STB of the user or PoP in a registry.

The registry is accessible by other application programs made available by the interactive television service provider via an application programming interface (API). The registry and indirectly the central repository may be edited and accessed by the user with the registration application. In the preferred embodiment, the API cannot edit the information on the registry or repository, so the information remains only accessible by the user in the registration application.

The central repository 100 provides efficient communication functionality for a single user or several accounts for use with applications such as banking or television commerce. The preferred server for the repository is a Sun Ultra 5 server, although an NT server or equivalent server may be used. The registration application program may be one written in OpenTV or an equivalent language. The registration application allows the input of information by a customer. The registration application is transmitted to a broadcast center. Transmission to the broadcast center may be via a terrestrial T1 link or its equivalent. The registration application program is then uplinked to a communications satellite, preferably a G8i satellite or equivalent. One or more customers, at a location within the satellite's footprint, in South America for example, receives the registration application program via an individual satellite dish, and then into a STB.

The customer's television set 40 (FIG. 1) is connected to a standard remote or keyboard as is known in the art, whereby the customer makes transactions or navigates through an interactive television interface portion of the registration application program. The customer inputs registration information into the registration application program via the interactive television interface. In the normal operation, the registration information is temporarily stored in the STB 35 (FIG. 1) as part of a data log. Preferably, the data log also includes a time and date stamp for each update of registration information by the customer.

The data log is then stored within memory 60 in the STB 35. Preferably, a flash memory is used and stored in a communication card with an identification number located within the STB. However, the data log may also be stored in random access memory stored within the STB. Thus, in the preferred embodiment, every time a customer adds or updates the information in the registry, the type of action and the time and date of the action within the registration application are stored in the data log in flash memory. When that information is transmitted to the central repository, it is compared with the information already in the repository. The date stamp ensures that the most recent information is included in the central repository.

Through a callback procedure, the data log is transmitted from the STB 35 through the modem. The data log is encapsulated in a data transfer protocol. Any appropriate protocol for data transmission may be used, such as TCP/IP or HTTP. In the preferred embodiment, the protocol is a proprietary SI protocol. Preferred proprietary protocols in the system include both SI and Reg.

In the callback procedure, the STB transmits the data log. The callback may be made at certain time intervals or after a fixed number of inputs, or upon some other standard. The callback is performed through a predetermined telephone number. The number provides the user with a unique PoP as seen by the system. The data log is then communicated to the central repository.

The callback originates as a program within the STB. The callback sends the data log from the STB to the central repository. In performing the callback, the STB is preferably programmed to make several attempts to transmit the data log if it fails initially to make the necessary connection.

After the data log is transferred from the STB, in the preferred embodiment an intervening server strips the transfer protocol from the data log and parses the registration information regarding the particular user within the data log before the information is included in the central repository. As shown below, the information can be for a particular user or for several accounts in the user's household.

Figure 7:
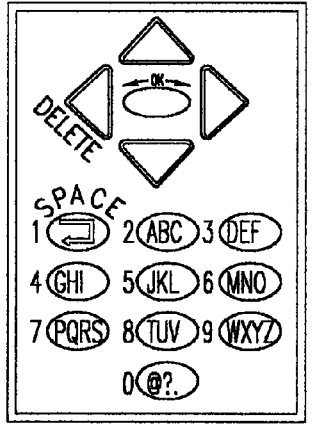
FIG. 7 is a screen shot of a screen for account creation in the preferred embodiment of the invention.
Figure 8:
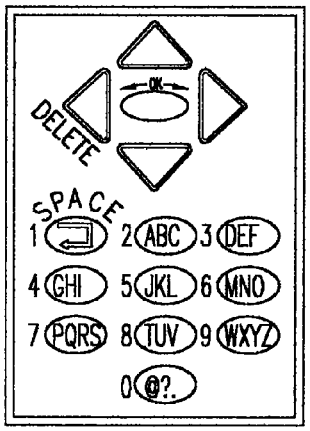
FIG. 8 is a screen shot of a screen for account editing in the preferred embodiment of the invention.
Figure 9:
FIG. 9 is a screen shot of a screen allowing the download of data from the central registry.

The following is the normal execution of steps taken by a user of the registration application of the present invention in the course of creating a user, or administrator, for the registration application for a particular PoP and adding individual accounts to be handled by the user:

1. The user calls up the registration application, which displays the main menu 200 as illustrated in FIG. 3.
2. The user sets up the telephone number for the callback to provide a PoP, as shown as an option in the screen 200 in FIG. 3. The user preferably scrolls down the list of telephone numbers and inputs the corresponding telephone number for the location of the user, as illustrated in the screen 210 in FIG. 4.
3. The user then creates an administrator, providing security information as shown in the screen 220 in FIG. 5.
4. One or more individual subsidiary accounts may then be set up by the administrator as shown in the screen 230 illustrated in FIG. 6. As shown, it is also possible for the administrator to amend the permissions or passwords of the accounts or delete them.
5. An account is edited or added by inputting appropriate information as shown in screens 240 and 250 in FIGS. 7 and 8.
6. After an account is created, it may be edited by the administrator, or by the person holding the account, after the proper password has been entered. Only the administrator would have permission to alter the administrator's account. However, in the preferred embodiment, the service provider would also have access to the administrator's account.
7. If for some reason, such as a power failure, the information from the central registry must be downloaded to the STB, that function is made available to the administrator as shown in the screen 260 in FIG. 9.

The following is the normal execution of steps taken by the system in the course of a user's creation or amendment of the registration information to include registration for a new application:

1. The registration application accepts the information from the user.
2. The registration application stores the information in the STB.
3. The STB places a time stamp on the information.
4. The STB transmits the information to the central repository via a backchannel.
5. Since the time stamp from the STB is more recent than the information in the registry, the information from the STB replaces that in the registry.

This completes the steps executed in a normal execution.

In an alternative embodiment, it is possible for the interactive television service to amend the registry independently from the STB. This function would be preferred in cases where a user's password was misappropriated, or temporary trouble arises with a user's remote.

Figure 10:
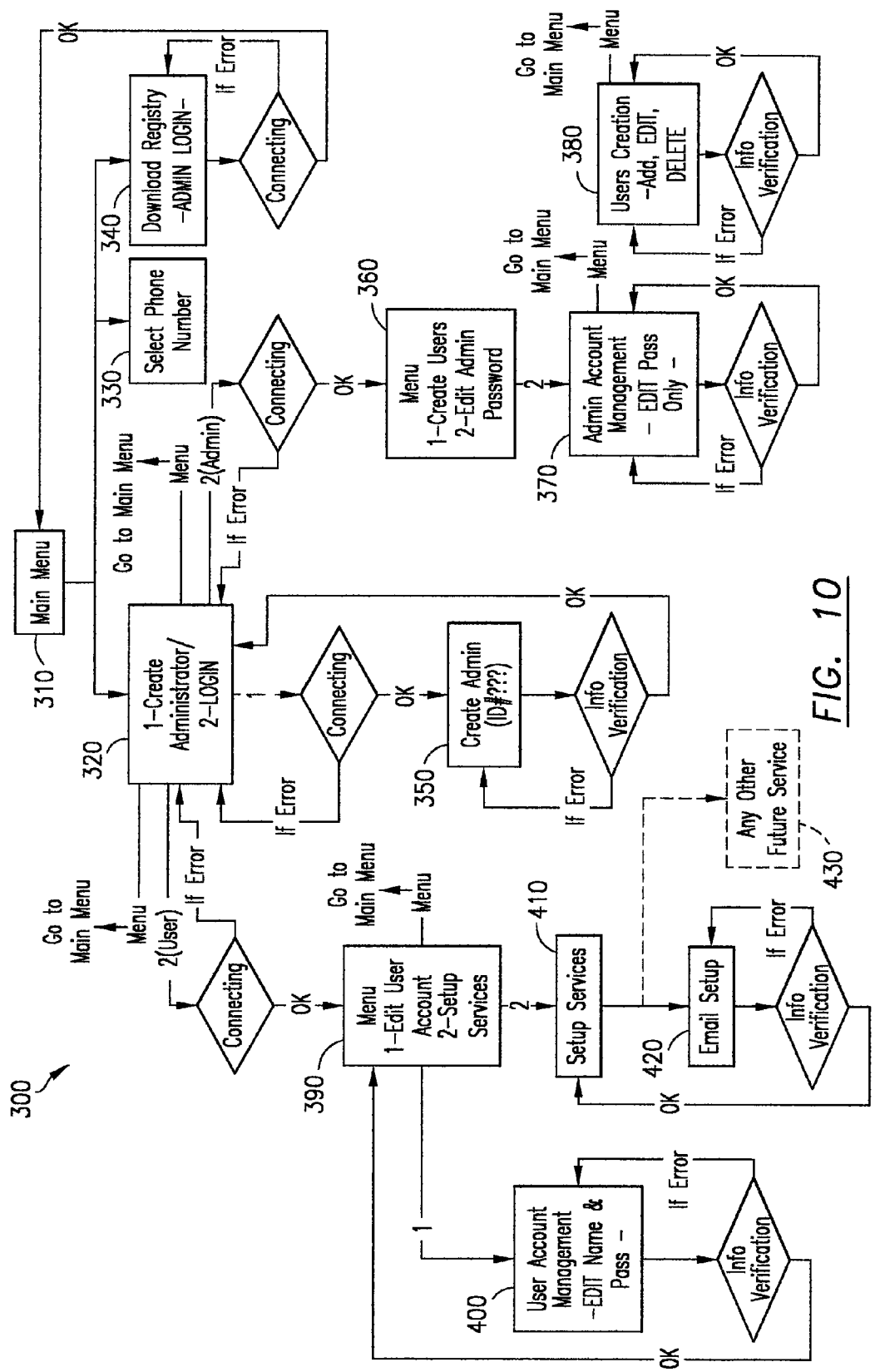
FIG. 10 is flow chart of the method of the invention.

The flowchart for the registration application, including its use for other applications such as e-mail, is illustrated in the flow chart 300 of FIG. 10. From the main menu 310, the user is presented with at least three choices: 1) create administrator 320 or login as a created administrator or subsidiary account holder, 2) select telephone number for a PoP 330, or 3) download information to the local registry from the central repository 340. In addition, before any interaction with the central repository is conducted, a phone number must be selected 330. In the initial presentation to the user, the user must first select a telephone number for a PoP. Then, if no administrator has been set up for the user, the user must login as an administrator. Preferably, if no administrator has been created, then this is the only option available, and no further navigation can be made until the step of creating an administrator 350 has been taken. Once these steps have been taken, further interaction is possible. In addition, as shown, downloading from the registry is preferably only available for a person logged in as an administrator.

An administrator has several more permissions than a subsidiary account holder. When a connection is made for an administrator, as shown at step 360, the administrator can either operate the administrator account 370 or administer subsidiary user accounts 380. The administrator has the ability to add, edit or delete subsidiary user accounts. This includes the granting or denying of permissions, such as e-mail or television-based commerce. As shown at 370, the administrator can only change the password of the administrator account.

If a person logs in as a subsidiary user, then the user is faced with the options of editing the particular user's account or setting up services 390. The user can then edit the account's name and/or password 400 or can set up the account so various applications provided by the interactive television service can be used. For example e-mail can be set up, or other services made available to the user, such as television-based commerce. Other applications, such as banking or pay-per-view products, may also be available. Those applications that the administrator did not grant permission for would not be allowed to be set up.

With the use of the apparatus and method shown in the present invention, interactive television is much more user friendly and more efficient in circumstances where the user has available multiple different applications for the enjoyment of the user. The drudgery and chore of constantly entering the same user common information into each different program is thereby eliminated so that the commonality of information once entered does not have to repeated.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for storing user input information for a plurality of disparate interactive television applications executed by a set-top-box disposed at a user location, the user input information comprising common user input information shared by the disparate interactive television applications executed by the set-top-box and other user input information, said method comprising the steps of:
   providing a shared data repository remote from the user location, the shared data repository for storing a user record including the user input information and other user records including further user input information associated with a plurality of other users;
   determining a portion of the user record for replication consisting of the common user input information shared by the disparate interactive television applications;
   providing a local data repository in the set-top-box storing the replicated portion of the user record;
   providing a registration application on the set-top-box at said user location, the registration application for collecting the user input information and for storing only common user input information in said local data repository, and for replicating changes to said user input information into the associated user record stored at the shared data repository; and
   providing an application programming interface (API) on the set-top-box, each API for interfacing with the interactive television applications on the set-top-box;
   wherein the interactive television applications search for and retrieve the common user input information from the associated local data repository via the API, and retrieve the other user input information not stored in the local data repository from the shared data repository; and
   wherein the interactive television applications include a user interface that directs the user to the registration application when additional common user input information is required by any of the interactive television applications.

2. The method of claim 1, wherein said user input information is provided for a specific point of presence (POP) for access by the user.

3. The method of claim 1, wherein the user is associated with a plurality of accounts created by and amended by the user.

4. The method of claim 3, wherein each of the plurality of created accounts has a unique password.

5. The method of claim 1, wherein the common user input information stored in the local data repository includes a time stamp indicating the time the user input the user input information.

6. The method of claim 1, wherein the interactive television applications include e-mail, banking, and game applications.

7. The method of claim 1, wherein said common user information stored in the local data repository includes only user information that must be accessed prior to activation of the interactive television application via satellite.

8. The method of claim 1, wherein only the registration application can modify the common user information stored in the local data repository and replicated to the shared data repository.

9. A system for providing user input registration information for a plurality of interactive television applications, the user information comprising common user input registration information shared by the interactive television applications and other user input registration information, said system comprising:
   (a) a set-top-box at a user location for executing the plurality of interactive television applications, each requiring user input registration information for activation, said set-top-box including a registry for storing common user input registration information shared by the plurality of the interactive television applications;
   (b) a central repository remote from the set-top-box for storing a user record comprising the user input registration information and other user records having further user input registration information from other set-top-boxes at other user locations;
   (c) a registration application executing in the set-top-box for collecting the user input registration information for at least one user account, for storing user input registration information determined to be the common user input registration information in said registry and for transmitting said user input registration information to said central repository to update said user record with said user input registration information; and
   wherein the interactive television applications search the registry and retrieve the common user input registration information via an application programming interface (API) to retrieve the common user input registration information, and connect to the central repository to retrieve the other user input registration information and not the common user input registration information;
   wherein at least one of the interactive television applications include a user interface that directs the user to the registration application when additional user input registration information is required by the at least one of the interactive television applications.

10. The system of claim 9, further comprising a point-of-presence locator for the set-top-box, the point-of-presence locator input by a user.

11. The system of claim 9, wherein the central repository is directly updateable by an interactive television service provider.

12. The system of claim 10, wherein the registration application further creates and edits a second user account account at the point of presence.

13. The system of claim 9, wherein the interactive television applications include an e-mail application.

14. The system of claim 9, wherein interactive television applications include a banking application.

15. The system of claim 9, wherein said common user input registration information includes only the user input registration information that must be accessed prior to activation of the respective interactive television application.

16. The system of claim 9, wherein only the registration application can modify the common user input registration information stored in the registry and replicated to the central repository.

17. A method of efficiently maintaining information pertaining to the registration of a user of a plurality of interactive television applications, said method comprising the steps of:
   collecting user input registration information, the user input registration information being input by a user for an interactive television application;
   generating a data log record at least in part by incorporating the user input registration information with a time stamp;
   storing common user input registration information from said data log record in a memory storage device in a set-top-box for use with other of the interactive television applications;

determining that at least one of the other of the interactive television applications requires at least a portion of the user input registration information;

determining, by the other of the interactive television applications, if the at least a portion of the required user input registration information is stored as common user registration information in the memory storage device;

retrieving the common user input registration from the memory storage device when the at least a portion of the required user input registration information is stored as common user input registration information in the memory storage device;

connecting to a central repository and retrieving the at least a portion of the required user input registration not stored as common user input registration information in the memory storage device only when the least a portion of the required user registration is not stored as common user input registration in the memory storage device;

directing the user to input additional user input registration information as required by the at least one of the other interactive television applications; and transmitting the data log record including the collected user input registration information and the additional user input registration information to the central repository for storage as a user record therein;

wherein the common user input registration information stored in the memory storage device is only a portion of the user record stored at the central repository.

18. The method of claim 17 further comprising the step of determining a unique point of presence of the user.

19. The method of claim 17, wherein the user registration input information is collected for one of a plurality of user accounts.

20. The method of claim 17, wherein the interactive television applications include interactive game, banking, and e-mail applications.

21. The method of claim 17, further comprising updating, by a interactive television service provider, the user input registration information of the user records stored in the central repository.

22. The method of claim 21, further comprising downloading updates to the common user input registration information in the user records from the central repository to the memory storage device in the set-top-box.

23. A method for storing user input information for a plurality of disparate interactive television applications executed by a set-top-box disposed at a user location, comprising the steps of:

collecting user input information in the set-top-box at a user location;

replicating the user input information in a shared data repository remote from the user location, the shared data repository storing a user record including the user input information and other user records including further user input information associated with a plurality of other users;

determining a portion of the user record shared by the disparate interactive television applications as common user input information;

replicating the determined portion of the user record in a local data repository in the set-top-box;

collecting further user input information via the registration application executed by the set-top-box at the user location, the further user information adding user input information or changing the user information;

replicating added or changed user input information in the shared data repository; and searching the local data repository for required user input information, the required user input information required by at least one of the interactive television applications, the required user input information comprising at least a portion of the common user input information; and retrieving the at least a portion of the common user input information required by the at least one interactive television application from local data repository.

24. The method of claim 23, wherein the step of searching the local data repository for the required user input information is performed by the at least one interactive television application via an application programming interface.

25. The method of claim 23, wherein:

the required user input information further comprises other user input information not determined to be common user input information; and the method further comprises retrieving the other user input information from the shared data repository.

26. The method of claim 25, wherein:

the required user input information further comprises further user input information not stored in the local data repository or the shared data repository; and the method further comprises querying the user to input the further user input information not stored in the local data repository or the shared data repository.

27. The method of claim 26, wherein the steps of collecting user input information, replicating the user input information in the shared data repository, replicating the determined portion of the user record in the local data repository, retrieving the other user input information from the shared data repository, and querying the user to input the further user input information not stored in the local data repository or the shared data repository is performed by a registration application executing in the set-top-box.

* * * * *